US010871588B2

(12) United States Patent
Beitz et al.

(10) Patent No.: US 10,871,588 B2
(45) Date of Patent: Dec. 22, 2020

(54) SEISMIC SURVEYS WITH INCREASED SHOT POINT INTERVALS FOR FAR OFFSETS

(71) Applicant: PGS Geophysical AS, Oslo (NO)

(72) Inventors: Manuel Beitz, Houston, TX (US); Christian Strand, Houston, TX (US)

(73) Assignee: PGS Geophysical AS, Oslo (NO)

(*) Notice: Subject to any disclaimer, the term of this patent is extended or adjusted under 35 U.S.C. 154(b) by 284 days.

(21) Appl. No.: 15/823,221

(22) Filed: Nov. 27, 2017

(65) Prior Publication Data

US 2018/0164457 A1 Jun. 14, 2018

Related U.S. Application Data

(60) Provisional application No. 62/434,222, filed on Dec. 14, 2016.

(51) Int. Cl.
*G01V 1/38* (2006.01)
*G01V 1/18* (2006.01)

(52) U.S. Cl.
CPC .......... *G01V 1/3808* (2013.01); *G01V 1/3843* (2013.01); *G01V 1/181* (2013.01); *G01V 1/186* (2013.01); *G01V 2210/127* (2013.01); *G01V 2210/1212* (2013.01); *G01V 2210/1293* (2013.01); *G01V 2210/1423* (2013.01); *G01V 2210/165* (2013.01)

(58) Field of Classification Search
CPC .... G01V 1/3808; G01V 1/3843; G01V 1/181; G01V 1/186; G01V 2210/1212; G01V 2210/1293; G01V 2210/1423; G01V 2210/165
See application file for complete search history.

(56) References Cited

U.S. PATENT DOCUMENTS 5,761,152 A * 6/1998 Jacobsen ............... G01V 1/3808
367/15
6,906,981 B2 6/2005 Vaage
(Continued)

FOREIGN PATENT DOCUMENTS

WO 2016/087947 6/2016

OTHER PUBLICATIONS

Long, et al, "Simultaneous Long Offset (SLO) Towed Streamer Seismic Acquisition," ASEG Extended Abstracts 2013: 23rd Geophysical Conference, Jun. 2013, 5 pages.
(Continued)

*Primary Examiner* — Krystine E Breier

(57) ABSTRACT

Techniques are disclosed relating to configuring a marine seismic survey. In some embodiments, a vessel may be coupled to one or more seismic sources and one or more seismic streamers, and a second vessel may be coupled to one or more far offset seismic sources. The near offset sources may be configured to actuate according to a shot point interval; the far offset sources may be configured to actuate according to a longer shot point interval. In some embodiments, the longer shot point interval may be a multiple of the near offset source shot point interval. Determining the first and second shot point intervals may be based in part on, for example, the wave frequencies of the far offset sources, the requirements of a full wave inversion process, or various configurational parameters of seismic surveys.

20 Claims, 13 Drawing Sheets

(56) References Cited

U.S. PATENT DOCUMENTS

| | | | |
|---|---|---|---|
| 9,081,107 B2* | 7/2015 | Abma | G01V 1/005 |
| 9,134,442 B2* | 9/2015 | Dellinger | G01V 1/005 |
| 9,261,619 B2* | 2/2016 | Mandroux | G01V 1/3808 |
| 9,678,235 B2* | 6/2017 | Widmaier | G01V 1/3817 |
| 9,772,412 B2* | 9/2017 | Mahmoud | G01V 1/003 |
| 10,197,690 B2* | 2/2019 | Malling | G01V 1/3826 |
| 2014/0321237 A1 | 10/2014 | Moldoveanu et al. | |
| 2015/0016218 A1 | 1/2015 | Welker et al. | |
| 2015/0346365 A1 | 12/2015 | Desrues | |
| 2015/0346368 A1 | 12/2015 | Dellinger et al. | |
| 2016/0187511 A1 | 6/2016 | Eick et al. | |
| 2016/0245944 A1 | 8/2016 | Mandroux et al. | |
| 2016/0356907 A1 | 12/2016 | Mensch | |
| 2017/0160415 A1 | 6/2017 | Winnett et al. | |
| 2017/0176613 A1* | 6/2017 | Burnett | G01V 11/00 |
| 2017/0363760 A1* | 12/2017 | Mensch | G01V 1/3808 |
| 2018/0001977 A1* | 1/2018 | Toennessen | G05D 1/0088 |

OTHER PUBLICATIONS

International Search Report and Written Opinion in Application No. PCT/EP2017/082558 dated May 4, 2018, 14 pages.

International Preliminary Report in Application No. PCT/EP2017/082558 dated Jun. 27, 2019, 8 pages.

Tsignas, et al., "Broadband Acquisition, Deblending, and Imaging Employing Dispersed Source Arrays," The Leading Edge, Apr. 2016, 354-60.

Lau, et al., "Low-Frequency Source for Long-Offset, Sub-Basalt and Deep Crustal Penetration," The Leading Edge, Jan. 2007, 36-39.

Berkhout, "Blended Acquisition with Dispersed Source Arrays," Geophysics vol. 77, No. 4, Jul.-Aug. 2012, A19-A23.

Campman, et al., "Sparse Seismic Wavefield Sampling," The Leading Edge, Aug. 2017, 308-314.

Berkhout, et al., "From Simultaneous Shooting to Blended Acquisition," SEG Las Vegas 2008 Annual Meeting, 2831-2838.

* cited by examiner

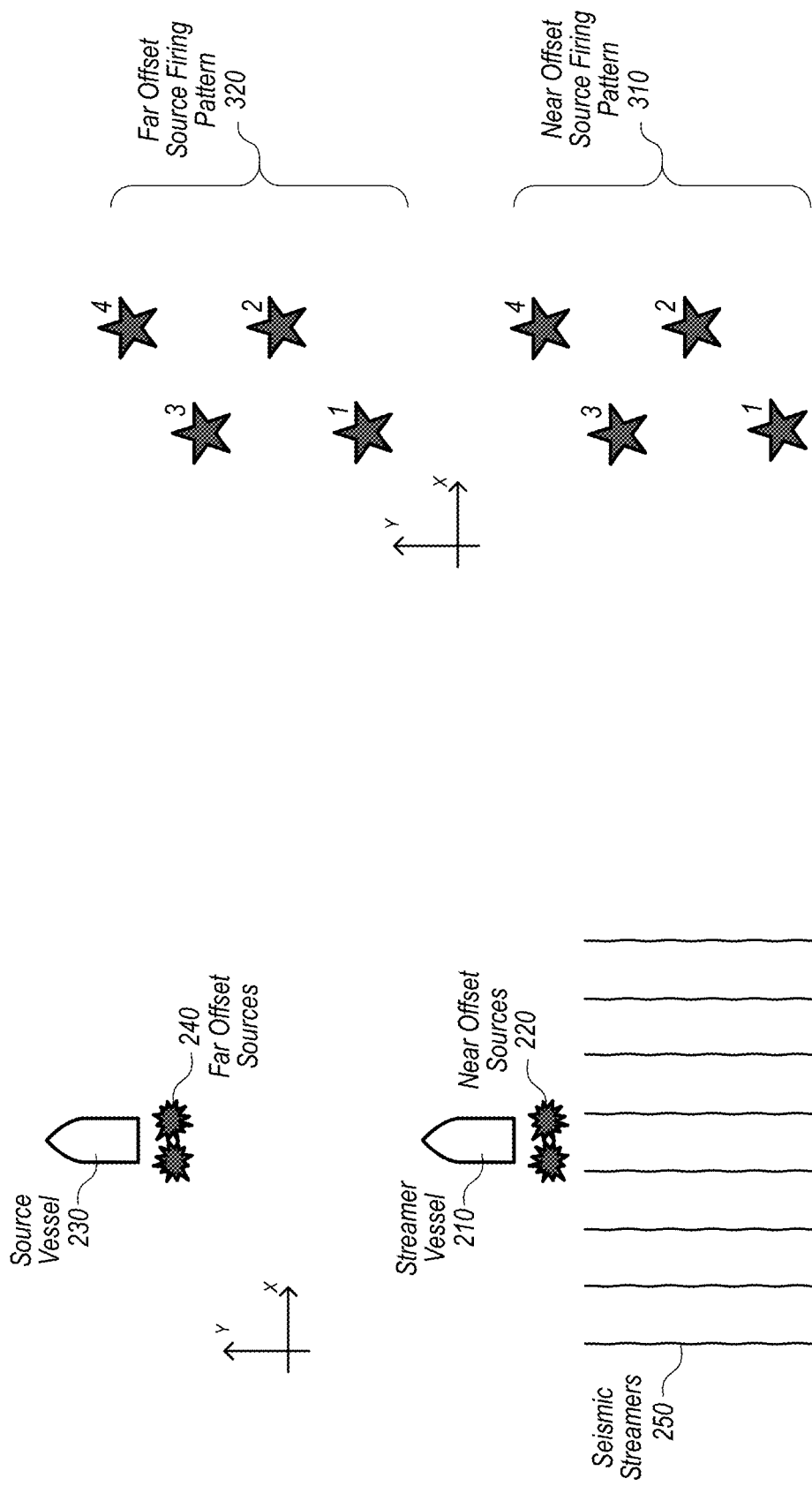

SEISMIC SURVEYS WITH INCREASED SHOT POINT INTERVALS FOR FAR OFFSETS

PRIORITY CLAIM

This application claims benefit of priority of U.S. Provisional Appl. No. 62/434,222, filed Dec. 14, 2016, which is incorporated by reference in its entirety.

BACKGROUND

Description of the Related Art

Marine seismic surveying is a technique for investigating geological features underneath bodies of water. Various configurations of vessels, seismic instruments, and seismic sources may be useful for different applications. The requirements of different applications for seismic data can influence the design of the seismic survey. Actuating additional seismic sources than are necessary can increase costs, environmental impact, or other unwanted effects.

BRIEF DESCRIPTION OF THE DRAWINGS

FIG. 2 is a diagram illustrating a layout for conducting a Simultaneous Long Offset (SLO) marine seismic survey, according to some embodiments.

FIG. 3 is a diagram illustrating a shot point interval for conducting an SLO marine seismic survey, according to some embodiments.

Figure 1:
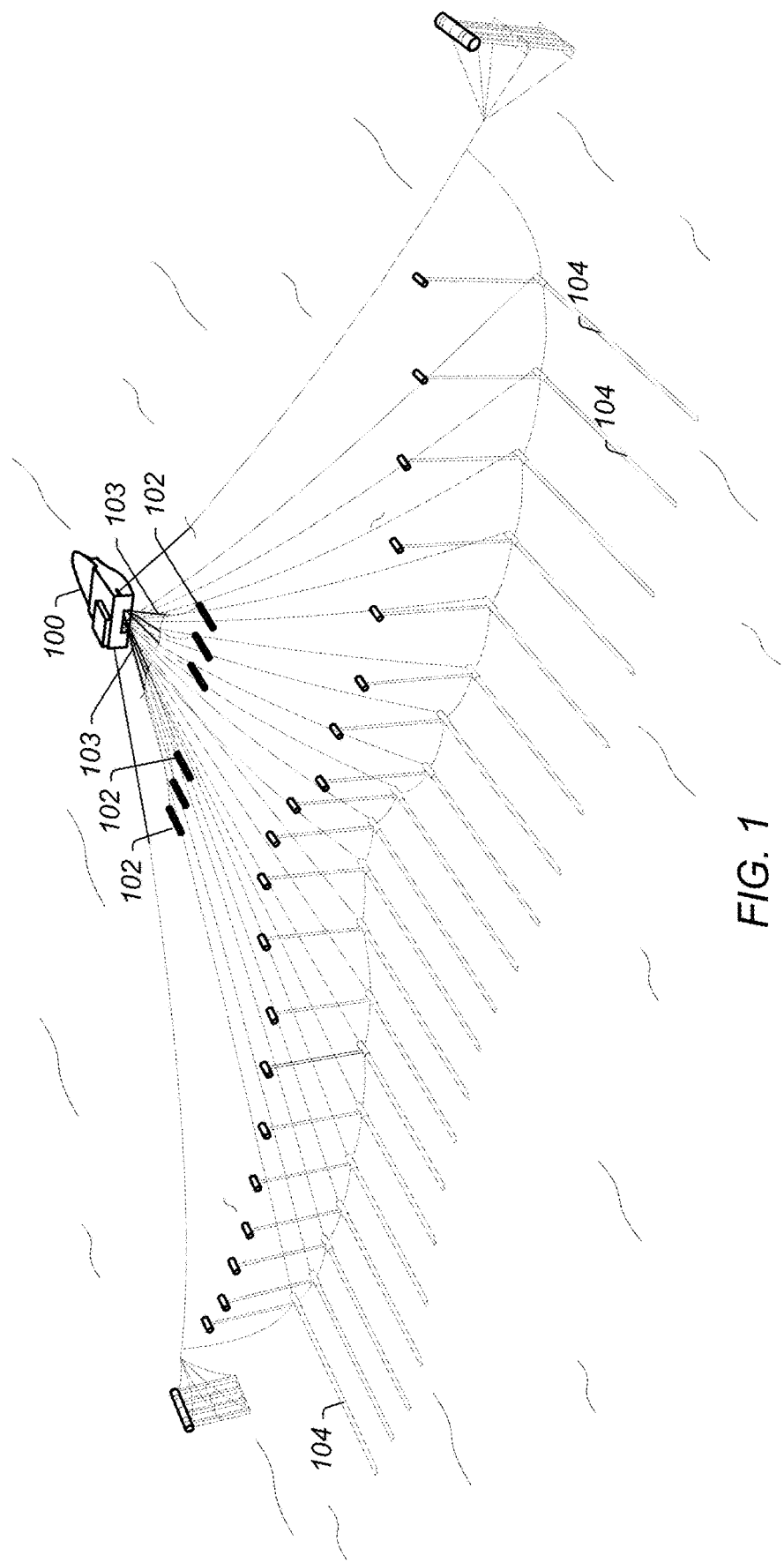
FIG. 1 is a diagram illustrating a system for conducting marine seismic surveys, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure, including the appended claims. Particular features, structures, or characteristics may be combined in any suitable manner consistent with this disclosure.

It is to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "mobile device configured to generate a hash value" is intended to cover, for example, a mobile device that performs this function during operation, even if the device in question is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "coupled to" may indicate one or more connections between elements, and a coupling may include intervening elements. That is, two elements may be indirectly coupled by virtue of intervening elements. By contrast, in the absence of intervening elements, two elements may be said to be "directly coupled" to one another.

DETAILED DESCRIPTION

Conducting a marine seismic survey can be a difficult and expensive operation. Actuating more seismic sources than are necessary can increase costs, environmental impact, or other unwanted effects. In some configurations, a survey may generate data that is unnecessary or at least not useful relative to the cost to acquire the data. For example, very large offset data may be discarded due to problems with image quality or the relatively minor improvement to the image. As another example, the Full Wave Inversion (FWI) process, discussed below, may be performed using only lower frequencies, which may not require spatial sampling that is as dense as the rest of the data set. Accordingly, in some embodiments of marine seismic surveys, seismic sources which are located at relatively far offsets are not actuated as often as sources at relatively near offsets. Various survey configurations may be implemented in this manner, including Simultaneous Long Offset (SLO), Wide Azimuth (WAZ), and multiple streamer arrays, all of which are discussed in turn below.

Turning now to FIG. 1, a diagram of one embodiment of an arrangement for conducting a marine geophysical survey using an array of towed submerged streamers is shown. In the embodiment shown, tow vessel 100 is towing an array of submerged streamers 104. Each of the submerged streamers may include a number of seismic sensors. The types of sensors that may be implemented in a given streamer include (but are not limited to) hydrophones and geophones. Moreover, a given streamer may include more than one type of sensor (e.g., a combination of hydrophones and geophones). Various operational considerations may make certain streamer towing depths advantageous. In some embodiments, single sensor streamers 104 may be towed at depths between about 4 meters and 30 meters. In some embodiments, dual sensor streamers may be towed at depths between about 15 and 30 meters.

Tow vessel 100 may also tow a number of sources 102 via tow cables 103. In some embodiments, sources 102 may be towed by another vessel or vessels (not shown). Sources 102 may include a variety of seismic sources, such as marine vibrators, air guns, etc. In some embodiments, sources 102 may transmit sound waves into the water, the echoes of which may be detected by the seismic sensors of the streamers 104. The sensors and receivers of streamers 104 may be coupled (e.g. electrically, wirelessly, etc.) to electronic equipment aboard tow vessel 100 that may be used to record or analyze geophysical data, such as received echoes or detected signals. Using the arrangement shown in FIG. 1, marine geophysical surveys may be conducted. Among the uses of information obtained from such surveys may be the identification of geological formations indicative of oil and/or natural gas deposits.

FIG. 2 illustrates an embodiment of a system configured for conducting a seismic survey. In the illustrated embodiment, a Simultaneous Long Offset (SLO) configuration is depicted: streamer vessel 210 tows at least two near offset sources 220 and an array of seismic streamers 250, while source vessel 230 tows at least two far offset sources 240. (In other embodiments, a single far offset source 240 may be used, or multiple different source vessels 230 may be employed.) In the illustrated embodiment, source vessel 230 is located ahead of streamer vessel 210 in the inline direction. The axes of FIG. 2 depict the inline direction as the y direction and the crossline direction as the x direction. The distance between vessels 210 and 230 may be varied depending on the configuration of the survey system; non-limiting examples of the distance between vessels 210 and 230 include 4, 6, and 8 kilometers, although the range is not limited in principle.

In some embodiments, at least one near offset source and at least one seismic streamer are coupled to the same vessel. In other embodiments, more near offset sources may be coupled to the vessel. In yet other embodiments, the seismic streamers 250 may be coupled to a separate vessel from the near offset sources.

FIG. 3 illustrates an embodiment of a Shot Point Interval (SPI) pattern corresponding to the SLO configured system of FIG. 2. In the illustrated embodiment, the sources actuate according to the SPI pattern: far offset sources actuate according to the pattern 320 and near offset sources actuate according to 310. Shot points number 1 through 4 for each of SPI patterns 310 and 320, where similar numbers between patterns 310 and 320 indicate the position of the sources at a common point in time. For example, shot point 1 in near offset pattern 310 and shot point 1 in far offset pattern 320 occur at approximately the same time. For the purposes of this disclosure, simultaneous actuation of sources includes actuating sources within a window of time such that energy recorded from the source activations overlaps to a degree that deblending of the overlapping energy must be performed. Moreover, in some embodiments, source actuations may be timed so that far and near offset data are partially overlapping or completely separated in time rather than substantially simultaneous.

In the illustrated embodiment, each of the two near offset sources actuate alternately and each of two far offset sources also actuate alternately. For example, the first far offset source 240 actuates at shot points 1 and 3 and the second actuates at shot points 2 and 4, in the illustrated embodiment. Similarly, in the illustrated embodiment, each of the two near offset sources 220 respectively actuate alternately: the first source actuates at points 1, 3, etc. while the second source actuates at points 2, 4, etc. The relative location of the stars in FIG. 3 illustrates the physical location of the sources in this embodiment at the time of actuation. The axes of FIG. 3 depict the inline direction as the y direction and the crossline direction as the x direction. In the illustrated embodiment, the far offset source vessel 240 moves in the same direction and speed as the vessel 210 so that the distance between shot points with the same number is the same for the near and far shot point interval patterns. For example, the distance between near offset point 1 and far offset point 1 is the same as the distance between near offset point 4 and far offset point 4, in the illustrated embodiment. In other embodiments, there may be additional sources which may actuate according to a different pattern; for example, there may be three sources which each actuate in a sequence, or there may be a single source that actuates at each point, or there may be other actuating patterns corresponding to various configurations of sources. In some embodiments, vessels 210 and 230 may not have the same number of sources.

In some embodiments, the advantages of actuating seismic sources at each point of far offset source pattern 320 may not outweigh the disadvantages. Downsides to actuating more than necessary include increased costs (e.g. a larger vessel may be required to support increased average source power), environmental impact, more seismic noise, or other unwanted effects. In some seismic surveys, the benefits of actuating a source at each shot point may be small; for example seismic surveys implementing the Full Wave Inversion (FWI) technique may not benefit from having as many far offset source actuations as near offset source actuations.

FWI is a data processing technique that may be used to process data collected by a seismic survey. FWI may include simulating seismic sources and propagating the waves through a model of the area being surveyed. The model may be iteratively updated according to a loss function that compares the simulated seismic measurements with the actual seismic measurements. In some embodiments, the complexity of calculating the wave propagation limits the amount of frequencies which are useful for FWI. In some embodiments, limiting the frequencies used may increase the speed of calculating or the accuracy with which the iterative updating process converges. In embodiments of seismic surveys where FWI is a desired technique, it may be advantageous to collect only the frequencies which are the most useful. The desired frequencies may be lower frequencies, e.g. below 25 Hz, below 15 Hz, below 10 Hz, below 8 Hz, etc.

Figure 4:
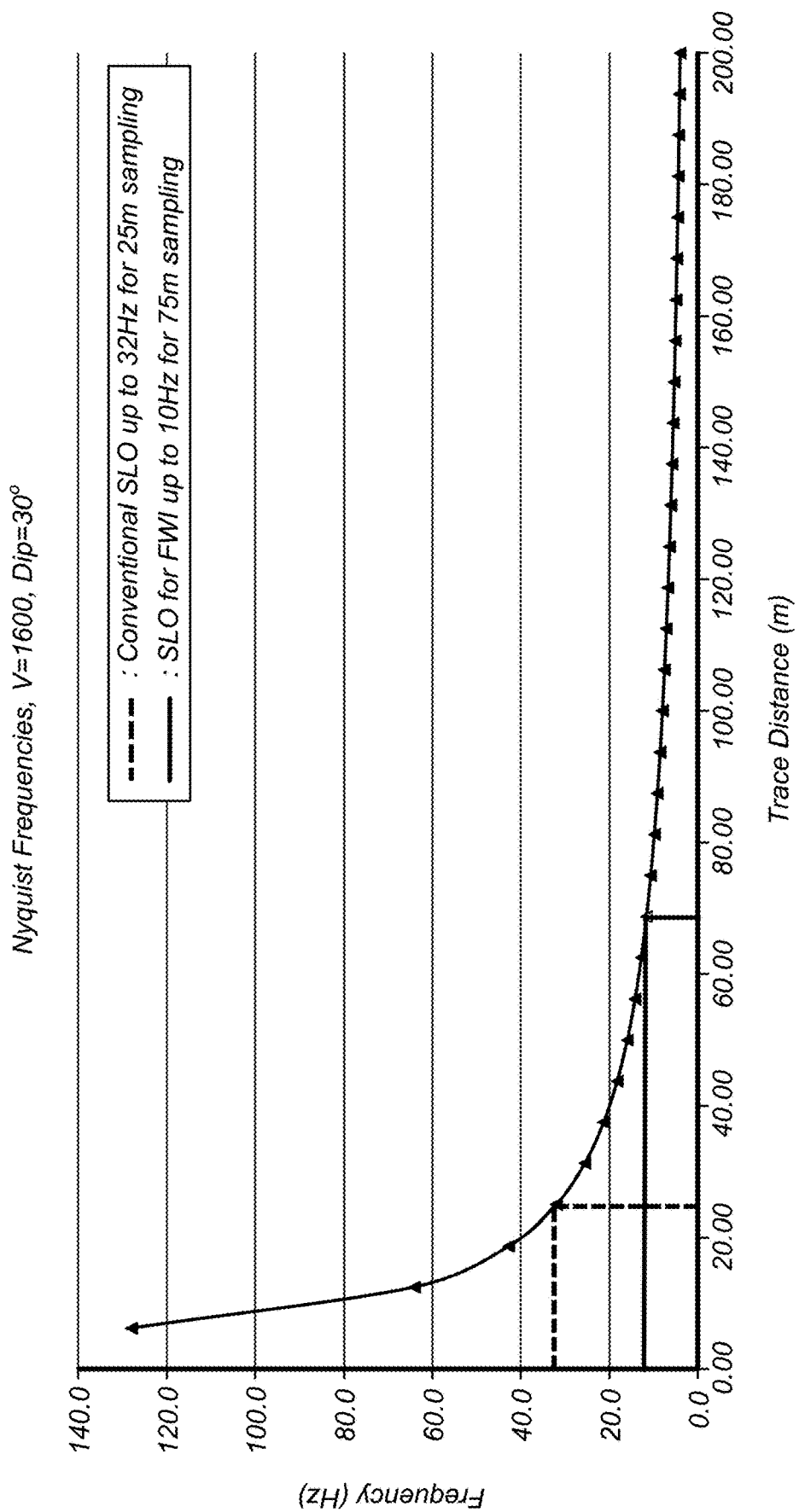
FIG. 4 is a diagram illustrating a relationship between frequency and trace distance, according to some embodiments.

FIG. 4 is a diagram that illustrates one example of a relationship between the Nyquist frequency of seismic signals and the distance between measured seismic traces. In the illustrated embodiment, the relationship shown on the graph by the triangular points corresponds to a wave velocity of 1600 m/s and a dip of 30 degrees. In some embodiments, increasing the frequency requirements of a measurement implies a non-linear decrease in the trace distance. In some embodiments, the trace distance corresponds to the distance between measuring devices (e.g. hydrophones, geophones, etc.) on a seismic streamer and/or the distance between source actuations.

In some embodiments, determination of various SPI's is based at least partially on the wave frequencies of far offset sources. In some embodiments, (as a non-limiting example, full wave inversion (FWI) or other configurations of seismic surveys) only certain frequencies may be required, as discussed above from FWI. In embodiments such as those, FIG. 4 may illustrate the trace distance that may provide appropriate data. As a non-limiting example, SLO for FWI may require frequencies up to 10 Hz; the corresponding trace distance may be 75 m for the particular conditions in the illustrated embodiment. Another example may be conventional SLO, which may require frequencies up to 32 Hz; the corresponding trace distance may be 25 m for the particular conditions in the illustrated embodiment.

Figure 5:
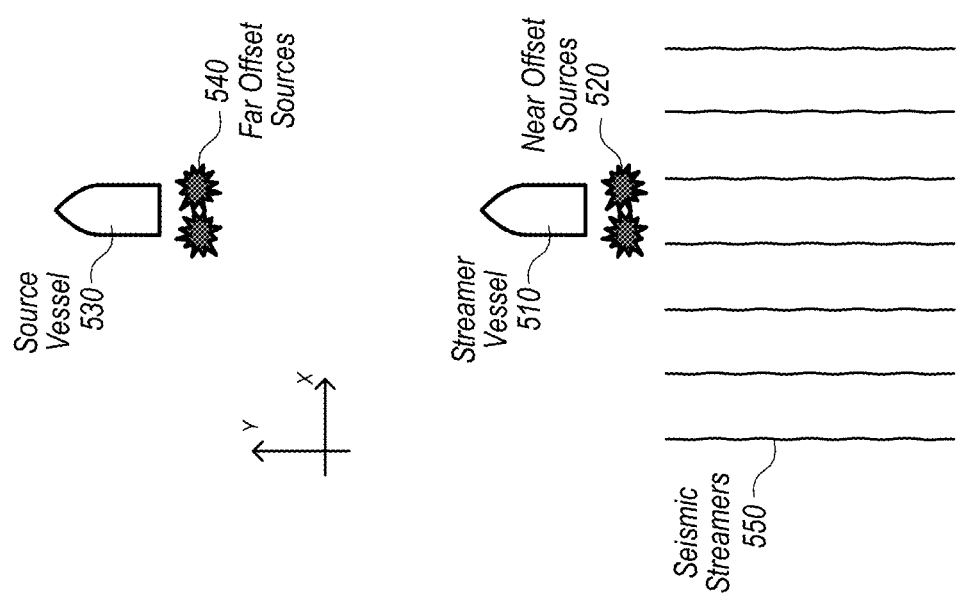
FIG. 5 is a diagram illustrating a layout for conducting a Simultaneous Long Offset (SLO) marine seismic survey, according to some embodiments.

Turning to FIG. 5, another embodiment of a system configured for conducting a seismic survey is shown. In the illustrated embodiment, an SLO configuration similar to FIG. 2 is depicted. Although the embodiments illustrated in FIGS. 2 and 5 are similar, other embodiments of either of the systems may be different, e.g. the distance between vessels 510 and 530 may be closer or farther than the distance in FIG. 2, the number or configuration of sources 520 or 540 may be different, or other parameters for configuring a seismic survey may be different. Similar to previous figures, the axes of FIG. 5 and FIG. 6 depict the inline direction as the y direction and the crossline direction as the x direction.

Figure 6:
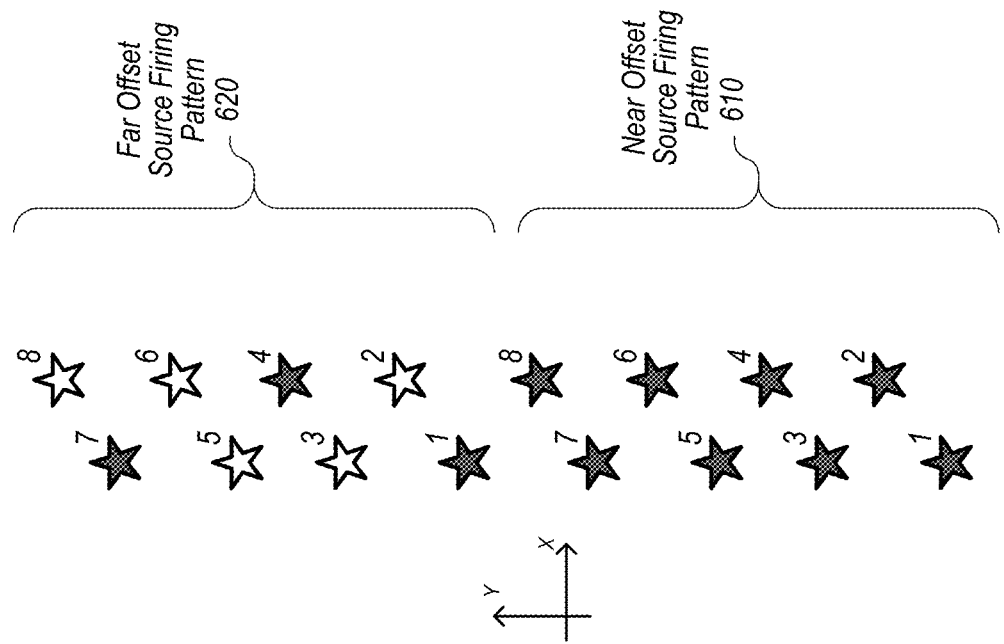
FIG. 6 is a diagram illustrating a shot point interval for conducting an SLO marine seismic survey with a longer far offset shot point interval, according to some embodiments.

The illustrated embodiment of FIG. 6 depicts an SPI pattern corresponding to the survey system of FIG. 5. This embodiment is different than the SPI pattern of FIG. 3 however. Similar to FIG. 3, far offset sources 540 may actuate according to far offset source pattern 620 while near offset sources 520 may actuate according to near offset source pattern 610. Shot points number 1 through 8 for each of SPI patterns 610 and 620, where similar numbers between patterns 610 and 620 indicate the position of the sources at a common point in time. As discussed below, in the illustrated embodiment, a source may not be actuated at certain shot points. However, if multiple sources are actuated at a given shot point, those actuations may actuate substantially simultaneously (e.g. shot point 1 from 610 and shot point 1 from 620 may be simultaneous, shot point 2 from 610 and shot point 2 from 620 may be simultaneous, etc.). In some embodiments, a near offset source actuates substantially simultaneously with a far offset source.

In the illustrated embodiment, far offset source pattern 620 illustrates some shot points that do not correspond to an actuation. In the illustrated embodiment, shot points 2, 3, 5, 6, and 8 from far offset source pattern 620 indicate that a far offset source should not be actuated, while the same shot point numbers from near offset source pattern 610 indicate that a near offset source should be actuated. In some embodiments, the near offset sources may actuate at all shot points or they may actuate at some shot points and not actuate at others. The illustrated embodiment depicts a far offset source actuating on every third shot point, but in other embodiments different patterns of actuation may be used (e.g. every other shot point, every fourth shot point, alternating between two and three inactive shot points, etc.).

In some embodiments, the shot point interval of one set of sources is an integer multiple of another set of sources, such that the first set of sources (e.g., the far offset sources) actuates less often than the second set of sources (e.g., the near offset sources). Moreover, in some instances, the shot point intervals of the two sets of sources may be aligned, such that when one of the far offset sources actuates, it does so substantially simultaneously with one of the near offset sources. As a non-limiting example, the far offset sources may be configured to actuate according to an interval that is substantially three times the shot point interval of the near offset sources, similar to the embodiment depicted in FIG. 6. In other embodiments, the far offset sources may actuate at other multiples; for an example, not intended to be limiting, the far offset source may actuate according to an interval that is 4, 5, 6, etc. times the near shot point interval. In some embodiments, sources that are configured in this manner may actuate substantially simultaneously. However, it is not necessary that the shot point interval of one set of sources be an integer multiple of another set of sources.

The reduced actuation of far offset source pattern 620 may provide enough data relating to low frequencies from seismic sources to perform a FWI analysis. As discussed in relation to FIG. 4, low frequency sources may not require actuations as frequently as high frequency sources. Additionally, higher frequencies may be attenuated at far offsets, limiting the usefulness of the far offset sources for high frequency applications. The benefits associated with fewer actuations, (e.g. lower cost, smaller environmental impact, lower seismic noise, etc. as discussed above) may be realized by far offset source pattern 620.

Figure 7:
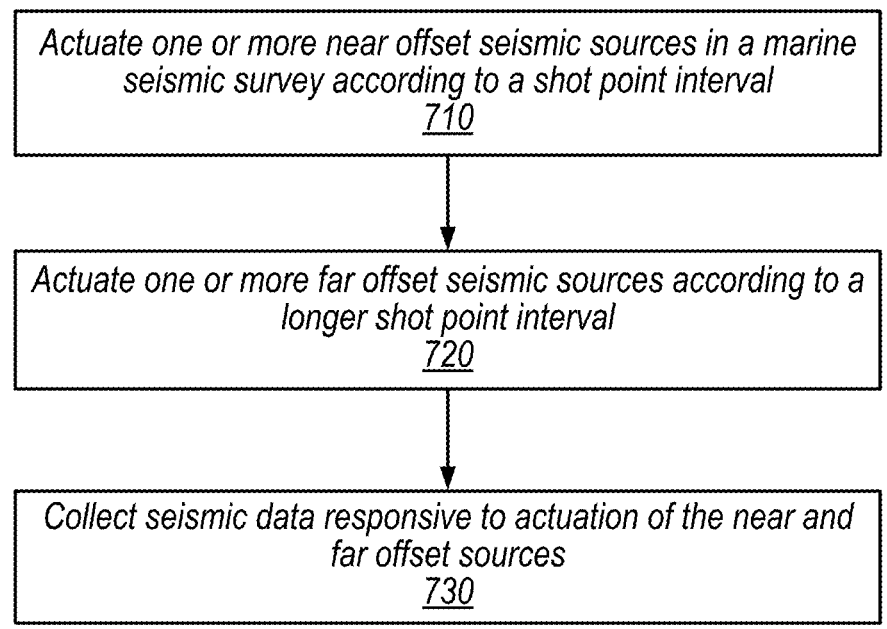
FIG. 7 is a flow diagram illustrating a method for conducting marine seismic surveys, according to some embodiments.

FIG. 7 is a flow diagram illustrating a method for performing a marine seismic survey, according to some embodiments. The method shown in FIG. 7 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 710 in the illustrated embodiment, one or more near offset seismic sources are actuated in a marine seismic survey according to a first shot point interval. In some embodiments, seismic sources include multiple arrays of air guns; separate arrays of air guns may be fired sequentially so that a specific shot point interval can be maintained, in some embodiments. One or more near offset sources may include an air gun or a marine vibrator, in some embodiments. In some embodiments, seismic sources may be configured to emit a majority of seismic energy at a frequency below 10 Hz.

A shot point interval may be defined in terms of the time between successive actuations of a seismic source or it may be defined in terms of the distance between successive actuations of a seismic source. Examples of shot point intervals, not intended to be limiting, include intervals as short as 6.25 m and ranging up to 50 m. In other embodiments, the shot point intervals may lie outside of this range.

At 720 in the illustrated embodiment, one or more far offset sources are actuated in a marine seismic survey according to a second shot point interval. In some embodiments, the second shot point interval is longer in distance or time than the first shot point interval. In some embodiments, one or more far offset sources are located at a greater distance from the seismic streamers than one or more near offset sources. Far offset sources may be coupled to a separate vessel than the streamers or near offset sources. In some embodiments, one or more far offset sources may include an air gun or a marine vibrator. In some embodiments, there may be fewer far offset sources than near offset sources.

At 730 in the illustrated embodiment, seismic data responsive to actuation of the near and far offset sources is collected. In some embodiments, the seismic streamers are configured to receive seismic data responsive to actuation of at least one near offset seismic source or at least one far offset seismic source. As discussed in greater detail below, a recording system may be configured to generate a stored record of the seismic data. Seismic data may include seismic traces or other data that is collected when seismic sources are being actuated. In some embodiments, the data responsive to the actuation of the near offset sources may be collected at the same time as the data responsive to the actuation of the far offset sources. The data responsive to the near and far offset sources may be received by the sensors within overlapping time periods in such a way as to allow for separation of the data from the respective sources, in some embodiments. For example, deblending or disambiguation of multiple simultaneously activated sources may occur during post-acquisition data processing.

Figure 8:
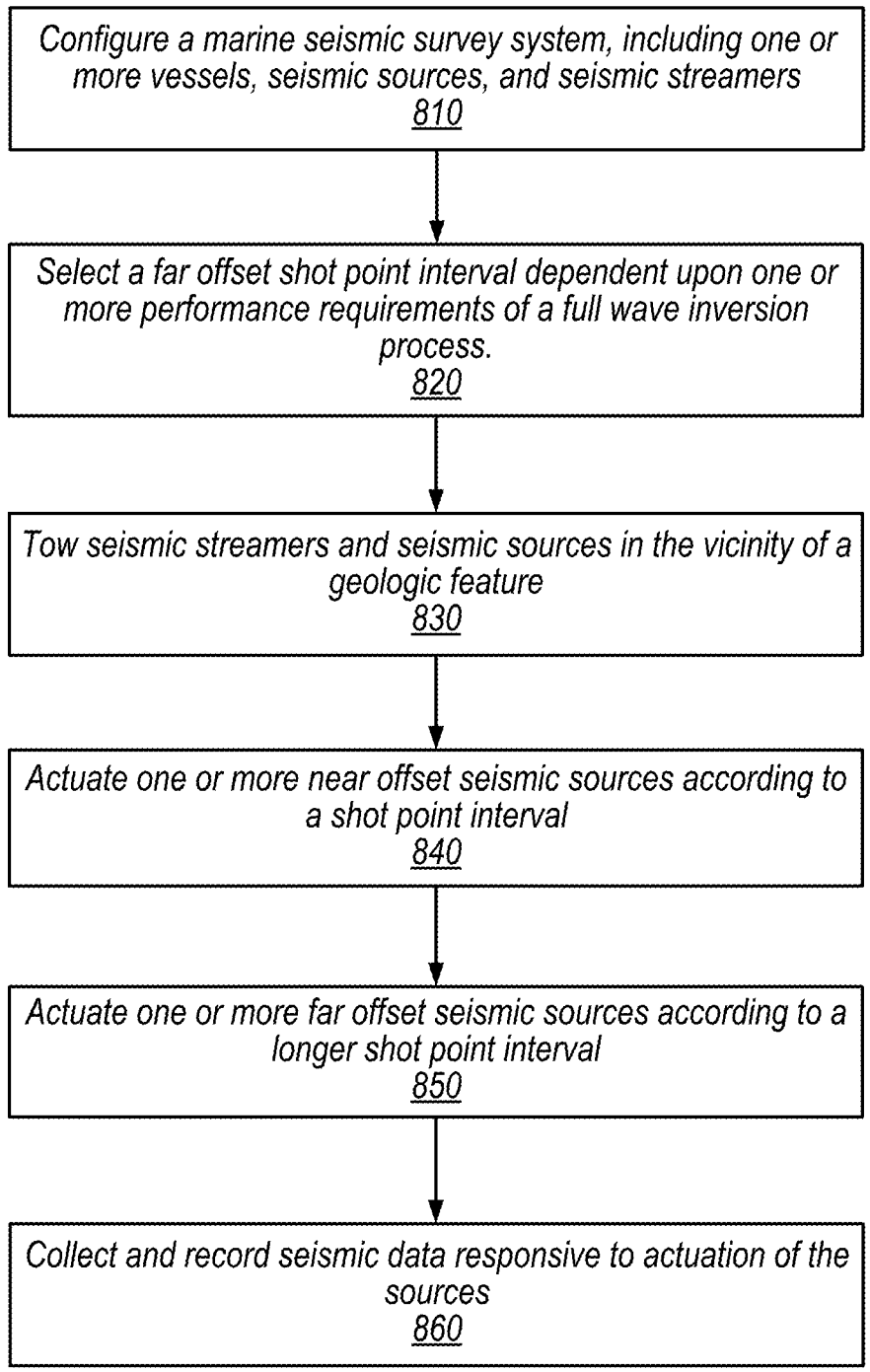
FIG. 8 is a flow diagram illustrating a method for conducting an SLO marine seismic survey with a longer far offset shot point interval, according to some embodiments.

In contrast to the previous figure, FIG. 8 is a flow diagram illustrating a more detailed method for performing a marine seismic survey, according to some embodiments. The method shown in FIG. 8 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 810 in the illustrated embodiment a marine seismic survey system is configured. Configuring the survey system may include choosing and configuring a number of vessels, configuring seismic sources and coupling them to vessels, configuring seismic streamers, coupling them to at least one vessel, configuring the streamers to receive data, or any other operations suitable for preparing a survey system for survey activity.

At 820 in the illustrated embodiment, a far offset SPI is selected. In some embodiments, SPI's may be dependent upon one or more performance requirements of a full wave inversion (FWI) process, as discussed above. In some embodiments, the selecting of the SPI includes choosing a multiple of the near offset source SPI, choosing particular shot points to refrain from actuating, or determining a distance between consecutive shot points. Performance requirements of the FWI process may include the amount of data collected at specific frequencies, the total amount of data collected, the level of noise in the data collected, or other parameters of a seismic survey that may impact the acquired data.

At 830 in the illustrated embodiment, seismic streamers and sources are towed in the vicinity of a geologic feature. Towing may include pulling the streamers and sources behind a vessel, in the water. Geologic features may include subterranean mineral, oil, or gas deposits, salt domes, or any other features capable of being imaged using seismic techniques.

At 840 in the illustrated embodiment, near offset seismic sources are actuated according to a SPI. In some embodiments, there may be two or more near offset seismic sources, and these sources may be actuated in an alternating fashion.

At 850 in the illustrated embodiment, far offset seismic sources are actuated according to a SPI. In some embodiments, there may be two or more far offset seismic sources, and these sources may be actuated in an alternating fashion. In the illustrated embodiment, the SPI of the far offset sources is longer than the SPI of the near offset sources. As described above, in some embodiments the SPI of the far offset sources may be a multiple of the SPI of the near offset sources.

At 860 in the illustrated embodiment, data responsive to the actuation of the seismic sources is collected and recorded. For example, pressure sensors and/or particle motion sensors (e.g., hydrophones and/or geophones) coupled to the streamer may collect seismic data from each shot point and this data may be recorded by a recording system which is coupled to the hydrophones or geophones. In some embodiments, the recording system may be a general-purpose computing system or a computing system specifically configured to record seismic data.

Figure 9:
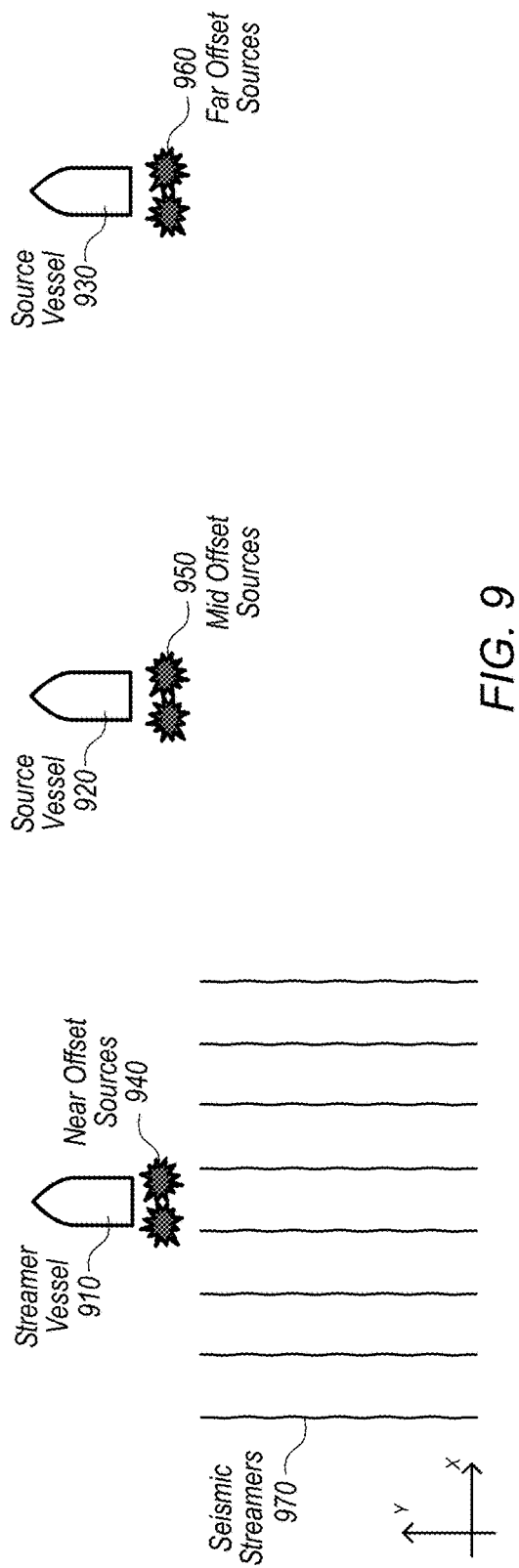
FIG. 9 is a diagram illustrating a layout for conducting a Wide Azimuth (WAZ) marine seismic survey, according to some embodiments.

FIG. 9 illustrates an embodiment of a system configured for conducting a seismic survey. Similar to FIGS. 3 and 5, FIG. 9 illustrates a set of vessels, 910, 920, and 930, a set of sources, 940, 950, and 960, and an array of seismic streamers, 970. In the illustrated embodiment, these components are configured in a Wide Azimuth (WAZ) layout, which may facilitate the collection of seismic data in the presence of obstructions (e.g., salt domes) that are difficult to image with other survey geometries. In this embodiment there may be two source vessels: a vessel 930 coupled to far offset sources 960, and a vessel 920 coupled to mid offset sources 950. Similar to previous figures, the axes of FIG. 9 depict the inline direction as the y direction and the crossline direction as the x direction. In some embodiments, all vessels may be located to one side (e.g., either port or starboard) of the streamer vessel 910, in the crossline direction, although it is possible for the source vessels to be located on different sides of streamer vessel 910 in a WAZ survey. In some embodiments, the one or more mid offset sources 950 and the one or more far offset sources 960 are located on the same side of the seismic streamers in the crossline direction. The mid offset sources may be located farther from the seismic streamers than the near offset sources 940 and closer to the seismic streamers than the far offset sources 960. In the illustrated embodiment, near offset sources 940 and seismic streamers 970 are coupled to streamer vessel 910.

Figure 10:
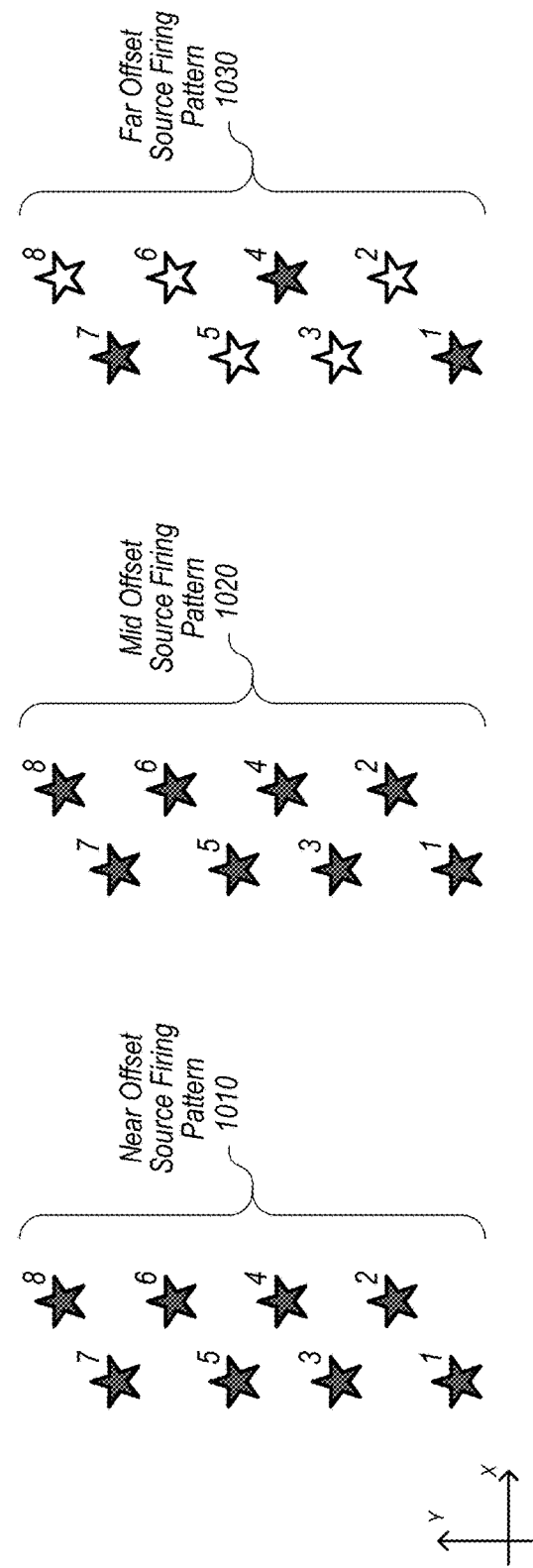
FIG. 10 is a diagram illustrating a shot point interval for conducting a WAZ marine seismic survey with a longer far offset shot point interval, according to some embodiments.

FIG. 10 illustrates an embodiment of a SPI configuration that corresponds to the WAZ configuration illustrated in FIG. 9. FIG. 10, similarly to FIG. 6, illustrates a set of shot points arranged in space, where the number for each shot point corresponds to a position of a source at a point in time when a source may be actuated. Similar to previous figures, the axes of FIG. 10 depict the inline direction as the y direction and the crossline direction as the x direction.

FIG. 10 includes a mid offset source firing pattern 1020. In some embodiments, the mid offset sources may be configured to actuate according to the same SPI as the near offset sources, or the far offset sources, or they may be configured to actuate according to an SPI that is not the same as either the near or far offset sources SPI.

In the illustrated embodiment, far offset source firing pattern 1030 includes shot points where no source actuation is indicated: shot points 2, 3, 5, 6, and 8. The illustrated embodiment shows the far offset source firing at an SPI that is three times longer than the near and mid offset SPIs; however, this is not intended to be a limiting example, and other configurations, as discussed previously, may be used.

Figure 11:
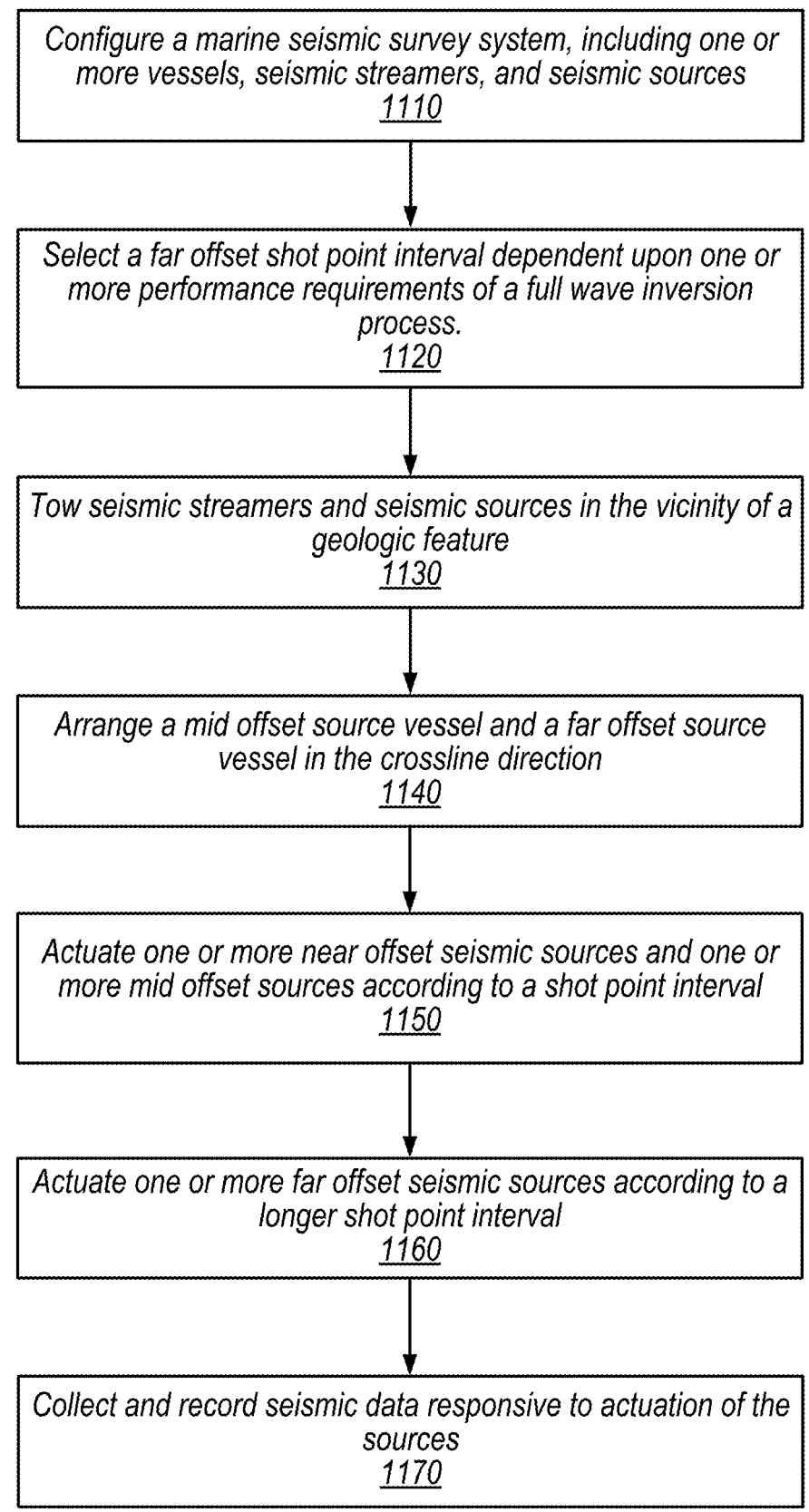
FIG. 11 is a flow diagram illustrating a method for conducting a WAZ marine seismic survey with a longer far offset shot point interval, according to some embodiments.

FIG. 11 is a flow diagram illustrating a method for performing a marine seismic survey, according to some embodiments. The method shown in FIG. 11 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

The method illustrated in FIG. 11 includes several elements which are substantially similar to the elements of FIG. 8. In the illustrated embodiment, elements 1110, 1120, and 1130 may be implemented similarly to elements 810, 820, and 830 of FIG. 8 respectively and will not be discussed further here. Element 1170 may be implemented similarly to element 860 of FIG. 8. Differences between the methods of FIG. 8 and FIG. 11 will be discussed below; it being noted that in other embodiments, the method of FIG. 11 may be implemented with more, fewer, or different elements and need not employ elements that are similar to those of FIG. 8.

At 1140 in the illustrated embodiment of FIG. 11, a mid offset source vessel and a far offset source vessel are arranged in the crossline direction. In some embodiments, the mid offset source vessel may be closer to the seismic streamer array than the far offset vessel and farther from the seismic streamer array than the near offset source vessel. In some embodiments, the near offset source vessel may tow both the near offset sources and the seismic streamer array.

At 1150 in the illustrated embodiment of FIG. 11, one or more near offset sources and one or more mid offset sources are actuated according to a shot point interval. In the illustrated embodiment, the SPI for the near and mid sources is the same. In some embodiments, the near offset sources and the mid offset sources actuate according to the same shot point interval. In other embodiments, the near and mid offset sources may actuate according to different intervals, or the mid offset sources may not actuate on each shot point. In some embodiments, mid offset sources actuate substantially simultaneously with the near offset sources; however in other embodiments they may not.

Step 1160 is similar to element 850 of FIG. 8, however in the illustrated embodiment of FIG. 11 the SPI of the far offset source may have a relationship to the mid offset source SPI as well as the near offset source. In some embodiments, the far offset source may have a longer SPI than both the near and mid offset sources, or it may have a longer SPI than the near offset source and a shorter SPI than the mid offset source, or it may have a longer SPI than the near offset source and the same SPI as the mid offset source, etc.

Figure 12:
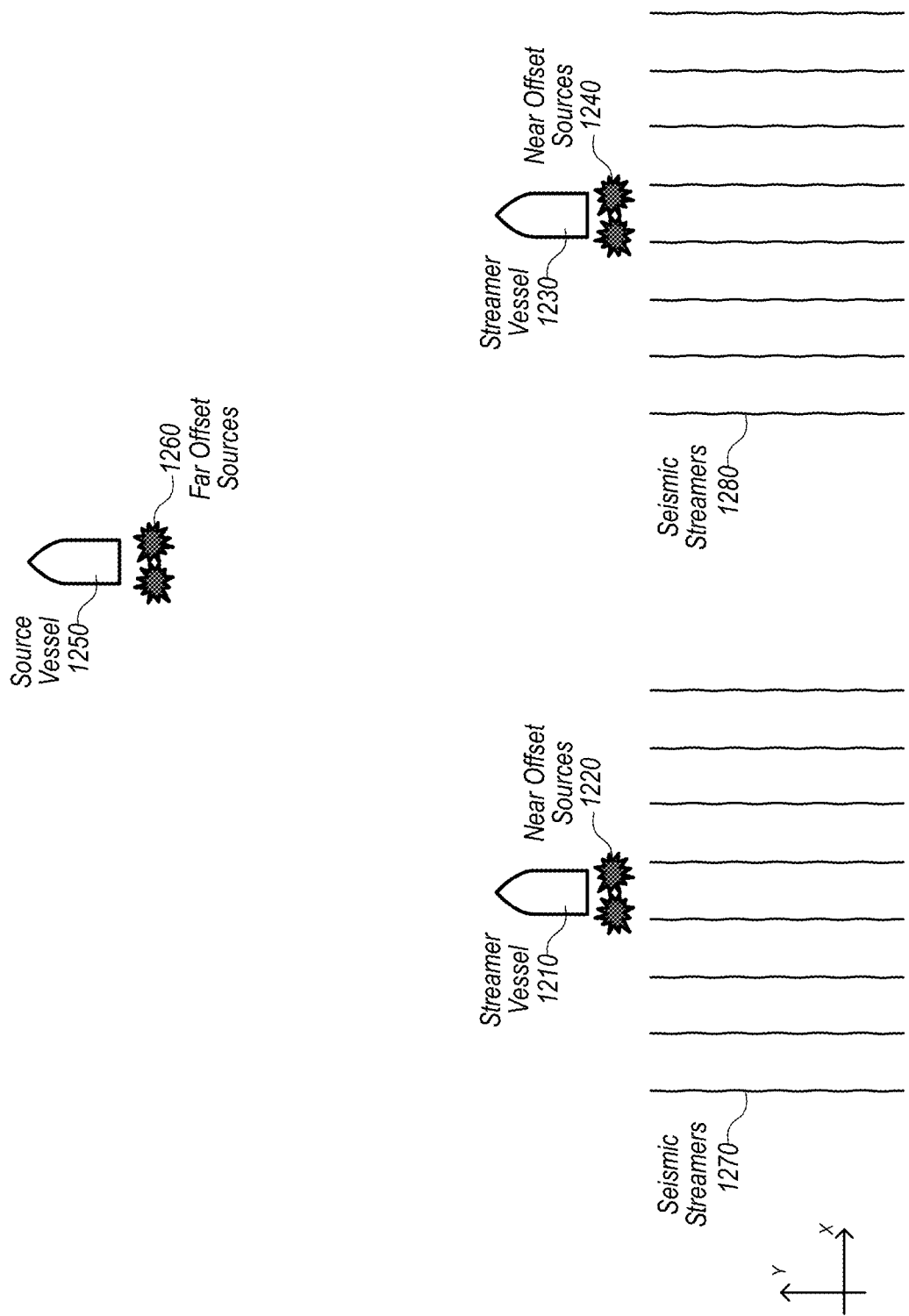
FIG. 12 is a diagram illustrating a layout for conducting a marine seismic survey using multiple streamer arrays, according to some embodiments.

FIG. 12 illustrates another embodiment of a system configured for conducting a seismic survey. Similar to FIGS. 3, 5, and 9, FIG. 12 illustrates a set of vessels, 1210, 1230, and 1250, a set of sources, 1220, 1240, and 1260, and arrays of seismic streamers, 1270 and 1280. Similar to previous figures, the axes of FIG. 12 depict the inline direction as the y direction and the crossline direction as the x direction. In the illustrated embodiment, these components are configured in a multiple streamer array layout, which, like the WAZ layout, may improve survey quality for some types of subsurface conditions. In this embodiment there may be three source vessels: a vessel 1250 coupled to far offset sources 1260, a vessel 1210 coupled to near offset sources 1220, and a vessel 1230 coupled to near offset sources 1240. In the illustrated embodiment, both near offset vessels may tow arrays of seismic streamers 1270 and 1280, and may be positioned such that vessel 1230 is in the crossline direction from vessel 1210; additionally, far offset source vessel 1250 may be positioned ahead of both vessels 1210 and 1230 in the inline direction and approximately mid-way between vessels 1210 and 1230 in the crossline direction. In some embodiments, one or more additional near offset sources (not shown) may deployed between vessels 1210 and 1230.

In some embodiments, vessel 1250 is located substantially equally distant from vessels 1210 and 1230. However, vessel 1250 may be deployed in any suitable position ranging from, e.g., directly in front of vessel 1210 to directly in front of vessel 1230. In some embodiments, the seismic streamers include at least two arrays of streamers that are respectively coupled to at least two seismic streamer vessels. In some embodiments, at least two near offset sources 1220 and 1240 are coupled respectively to at least two vessels 1210 and 1230, and at least one far offset source 1260 is located substantially equally distant from vessels 1210 and 1230.

In some embodiments, like the survey configurations discussed above, near offset sources 1220 and 1240 may contain more or fewer seismic sources than in the illustrated embodiment, and seismic streamers arrays 1270 and 1280 may be comprised of more or fewer seismic streamers than in the illustrated embodiment. In some embodiments, there may be additional vessels which may be coupled to additional sources or streamers. In some embodiments, far offset source vessel 1250 may be positioned, as non-limiting examples, closer to vessel 1210, closer to vessel 1230, farther in the crossline direction than vessel 1230, etc.

Figure 13:
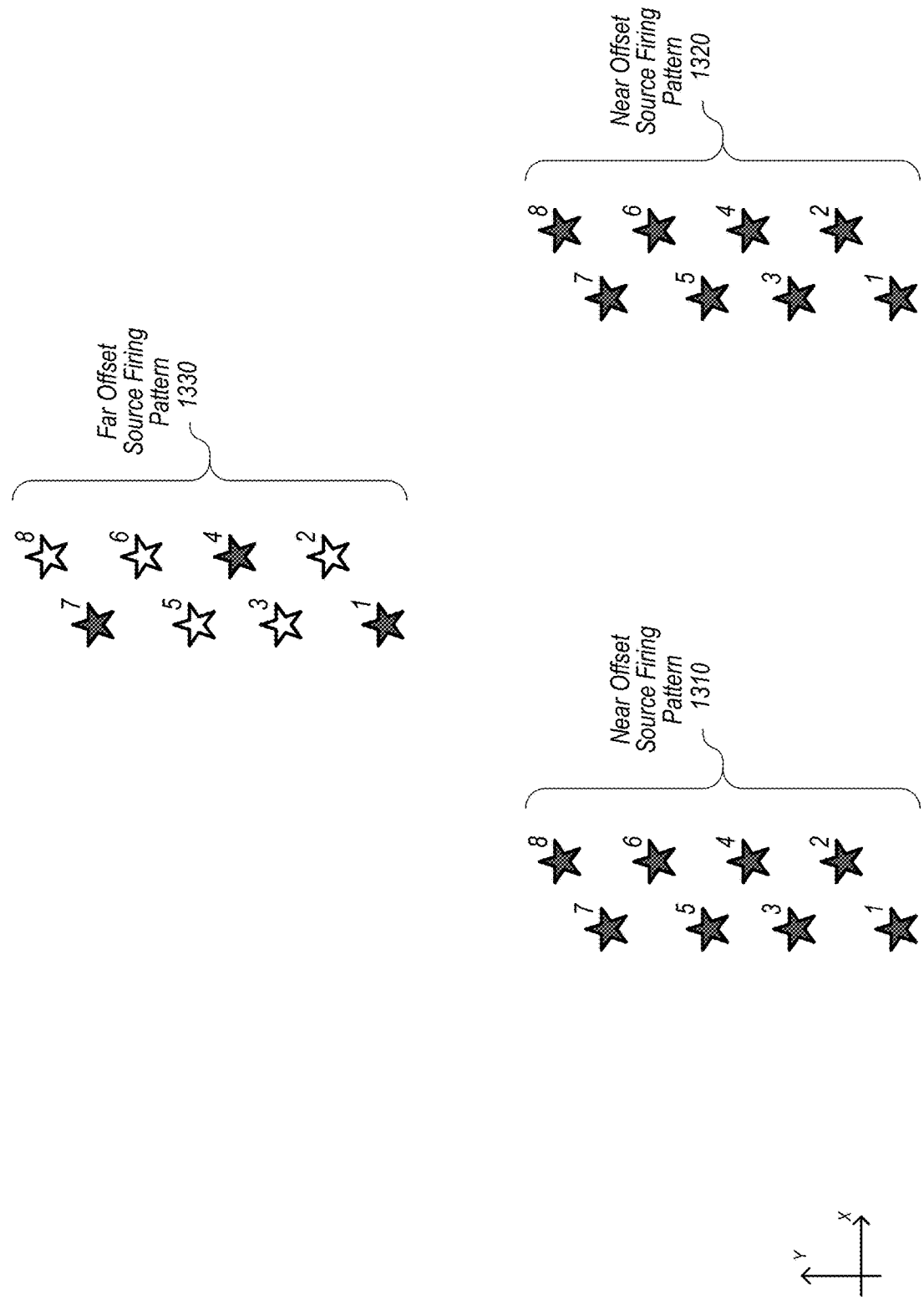
FIG. 13 is a diagram illustrating a shot point interval for conducting a marine seismic survey according to the layout of FIG. 12 with a longer far offset shot point interval, according to some embodiments.

FIG. 13 illustrates an embodiment of a SPI that corresponds to the multiple streamer array configuration illustrated in FIG. 12. FIG. 13, similarly to FIG. 10 and FIG. 6, illustrates a set of shot points arranged in space, where the number for each shot point indicates a position of a source at a point in time when the source may be actuated; the axes of FIG. 13 depict the inline direction as the y direction and the crossline direction as the x direction.

FIG. 13 includes two near offset source firing patterns, 1310 and 1320. In the illustrated embodiment, the near offset sources 1220 and 1240 may be configured to actuate according to the same SPI, which may result in pattern 1310 being the same as pattern 1320. In some embodiments, sources 1220 and 1240 may be configured to actuate according to an SPI that is not the same, e.g., pattern 1310 may be different from pattern 1320.

In the illustrated embodiment, far offset source firing pattern 1330 includes shot points where no source actuation is indicated: shot points 2, 3, 5, 6, and 8. The illustrated embodiment shows the far offset source firing at an SPI that is three times longer than the near and mid offset SPIs; however, this is not intended to be a limiting example, and other configurations, as discussed previously, may be used.

Figure 14:
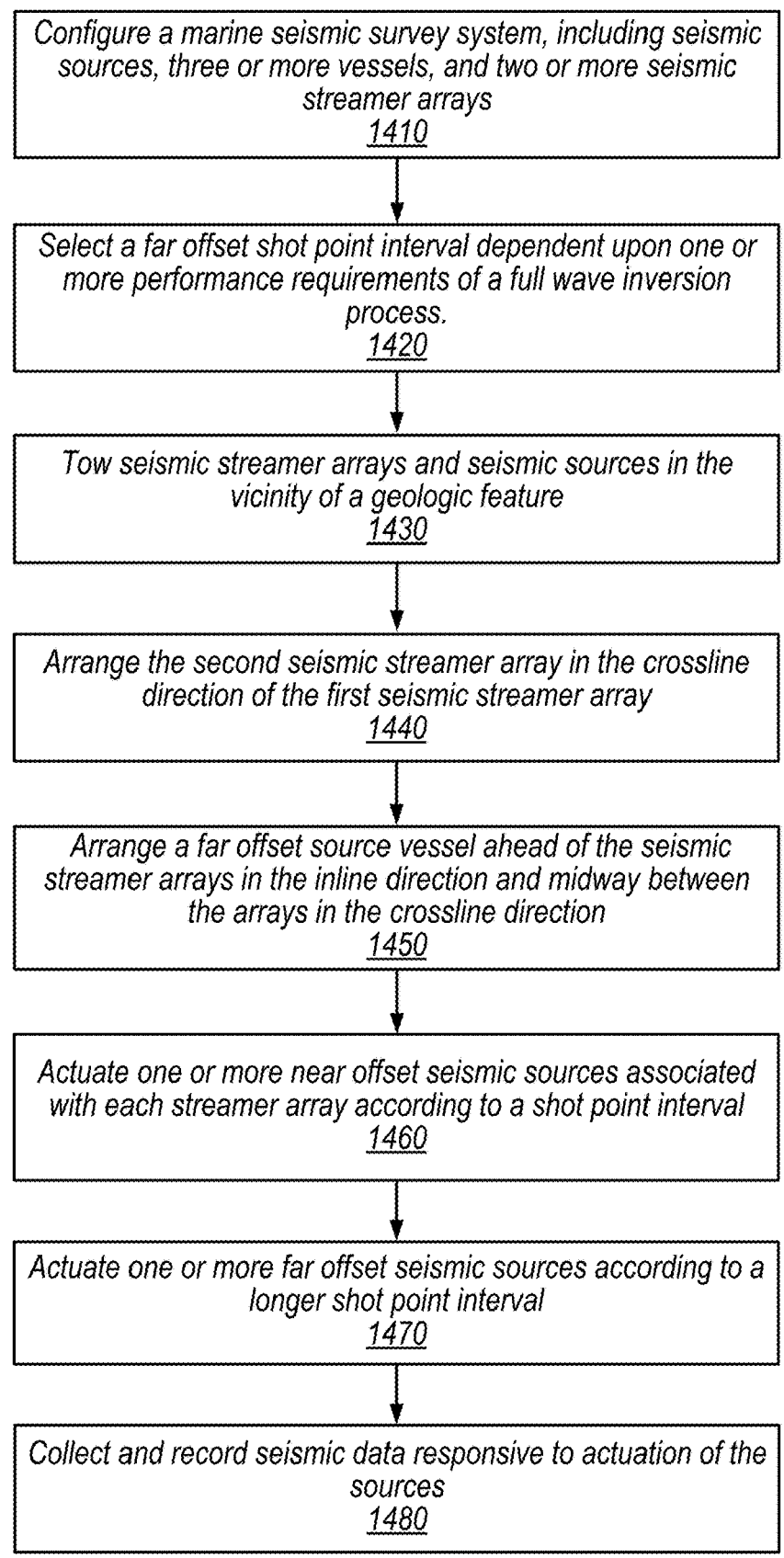
FIG. 14 is a flow diagram illustrating a method for conducting a marine seismic survey according to the layout of FIG. 12 with a longer far offset shot point interval, according to some embodiments.

FIG. 14 is a flow diagram illustrating a method for performing a marine seismic survey, according to some embodiments. The method shown in FIG. 14 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

The method illustrated in FIG. 14 includes several elements which are substantially similar to the elements of FIG. 8. In the illustrated embodiment, elements 1420 and 1430 may be implemented similarly to elements 820 and 830 of FIG. 8 respectively and will not be discussed further here. Element 1480 may be implemented similarly to element 860 of FIG. 8. Differences between the methods of FIG. 14 and FIG. 8 will be discussed below; it being noted that in other embodiments, the method of FIG. 11 may be implemented with more, fewer, or different elements and need not employ elements that are similar to those of FIG. 8.

At 1410 in the illustrated embodiment of FIG. 14, a marine seismic survey system which includes seismic sources, three or more vessels, and two or more seismic streamer arrays is illustrated. Step 1410 illustrates a similar system as element 810 of FIG. 8; however 1410 specifically includes 3 or more vessels and 2 or more streamer arrays. In some embodiments the method illustrated in FIG. 14 may describe a multiple streamer array process similar to that illustrated in FIGS. 12 and 13.

At element 1440 in the illustrated embodiment of FIG. 14, the second streamer array may be arranged in the crossline direction from the first streamer array. In some embodiments, the second streamer array may be arranged on the port side or the starboard side of the first streamer array. The streamer arrays may have, in some embodiments, different numbers of streamers, different lengths of streamers, different sensors on the streamers, etc.

At element 1450 in the illustrated embodiment, a far offset source vessel is arranged ahead of the two seismic streamer vessels in the inline direction and midway between the two seismic streamer vessels in the crossline direction. In some embodiments, the far offset source vessel may be closer to one streamer vessel or the other in the crossline direction, or the source vessel may be located farther in the port or starboard direction than either of the streamer vessels.

At 1460 in the illustrated embodiment, one or more near offset seismic sources associated with each streamer array are actuated according to a shot point interval. In some embodiments, the sources associated with each streamer are actuated according to the same SPI; in other embodiments, the sets of sources may be actuated according to different SPI's. In some embodiments, there are seismic sources coupled to each vessel that tows streamer arrays.

At 1470 in the illustrated embodiment, one or more far offset seismic sources are actuated according to a longer shot point interval. This element may be similar to 850 of FIG. 8, however the far offset source may have a relationship to either of the near offset sources, in some embodiments. In some embodiments, the SPI of the far offset source is longer than either of the SPI's of the near offset sources. In some embodiments, the near offset sources may have different SPI's, and the far offset source may have, for example, a longer SPI than one or the other, or both of the near offset sources.

Figure 15:
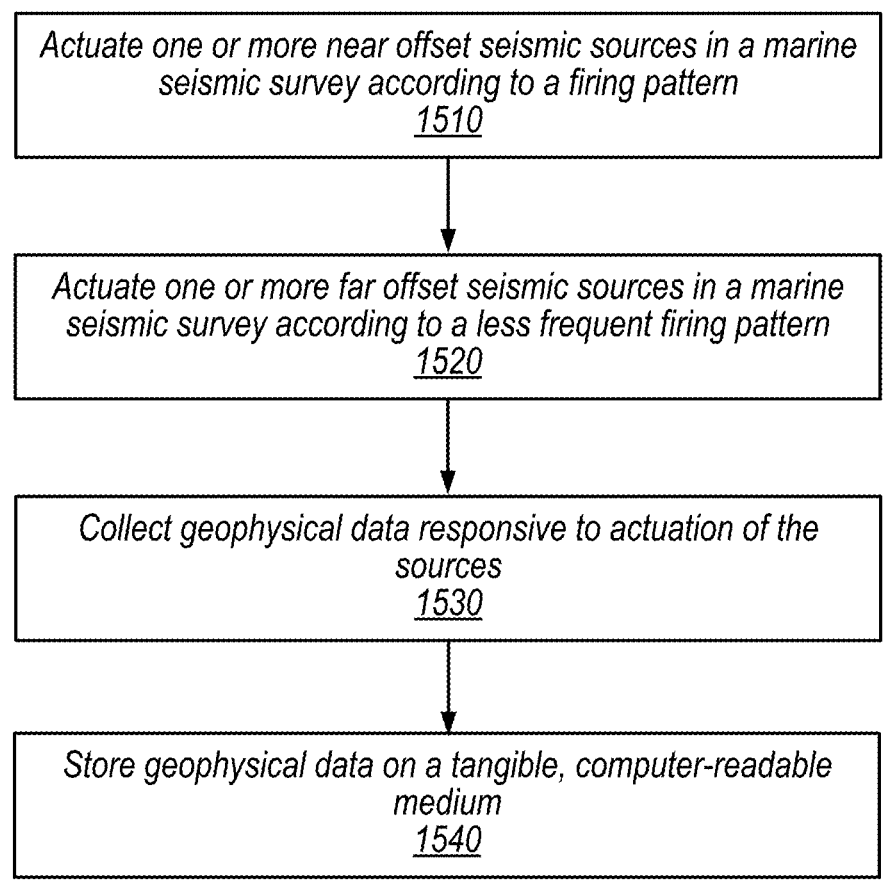
FIG. 15 is a flow diagram illustrating a method for conducting marine seismic surveys, according to some embodiments.

FIG. 15 is a flow diagram illustrating a method for performing a marine seismic survey, according to some embodiments. More particularly, as described in greater detail below, FIG. 15 relates to the generation of a geophysical data product based on survey data. The method shown in FIG. 15 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

In some embodiments, collected survey data may be embodied in a "geophysical data product." A geophysical data product may comprise a computer-readable, non-transitory medium having geophysical data stored on the medium, including, e.g., raw streamer data, processed streamer data, two- or three-dimensional maps based on streamer data, or other suitable representations. Some non-limiting examples of computer-readable media may include hard drives, CDs, DVDs, flash memory, print-outs, etc. In some embodiments, raw analog data from streamers may be stored in the geophysical data product. In other instances, the data may first be digitized and/or conditioned prior to being stored in the geophysical data product. In yet other instances, the data may be fully processed into a two- or three-dimensional map of the various geophysical structures before being stored in the geophysical data product. The geophysical data product may be manufactured during the course of a survey (e.g., by equipment on a vessel) and then, in some instances, transferred to another location for geophysical analysis, although analysis of the geophysical data product may occur contemporaneously with survey data collection.

At 1510 in the illustrated embodiment, one or more near offset seismic sources are actuated in a marine seismic survey according to a firing pattern. Embodiments of seismic sources and configurations of seismic surveys have been discussed previously; further reference may be found in the discussion related to 710 of FIG. 7. A firing pattern may indicate, among other things, the manner or order in which seismic sources actuate. In some embodiments, the firing pattern may be described similarly to a shot point interval. In some embodiments, the firing pattern may include time or distance between actuations, and may vary from one actuation to another.

In some embodiments, two or more near offset sources are actuated alternately. In embodiments with two near offset sources, this may include actuating the first source, then actuating the second source, then actuating the first source again, etc. In some embodiments, more than two near offset sources may be actuated in an alternating manner by actuating each source in a sequence, or alternating actuation in another pattern or at random. Multiple near offset sources may also be actuated simultaneously rather than, or in addition to, alternately.

At 1520 in the illustrated embodiment, one or more far offset sources are actuated in a marine seismic survey according to a less frequent firing pattern. In some embodiments, far offset sources are located at a greater distance from the seismic streamers than near offset sources. Far offset sources may be coupled to a separate vessel than the streamers or near offset sources. In some embodiments, a less frequent firing pattern may correspond to a longer shot point interval; for example, actuating a source less frequency may imply a greater distance or time between actuations.

In some embodiments, two or more far offset seismic sources are actuated alternately. Alternately actuating the far offset seismic sources may be done in a similar manner as described for near offset sources above. In some embodiments, the firing pattern for the near offset sources fires substantially three times as often as the firing pattern for the far offset sources.

At 1530 in the illustrated embodiment, geophysical data responsive to actuation of the one or more near and one or more far offset sources is collected. Geophysical data may include seismic traces or other data that is collected during a seismic survey. In some embodiments, geophysical data includes seismic data, such as data recorded by pressure and/or particle motion sensors. In some embodiments, the data responsive to the actuation of the near offset sources may be collected at the same time as the data responsive to the actuation of the far offset sources. The data responsive to the near and far offset sources may be indistinguishable or it may be collected in such a way as to separate the data from the respective sources, in some embodiments.

At 1540 in the illustrated embodiment, geophysical data is stored on a tangible computer-readable medium, thereby completing the manufacture of a geophysical data product. As noted above, non-limiting examples of the medium may include: a magnetic hard disk drive, computer memory, nonvolatile memory, a DVD, a tape drive, a cassette disk, optical media, a combination of the previously mentioned media, etc.

Figure 16:
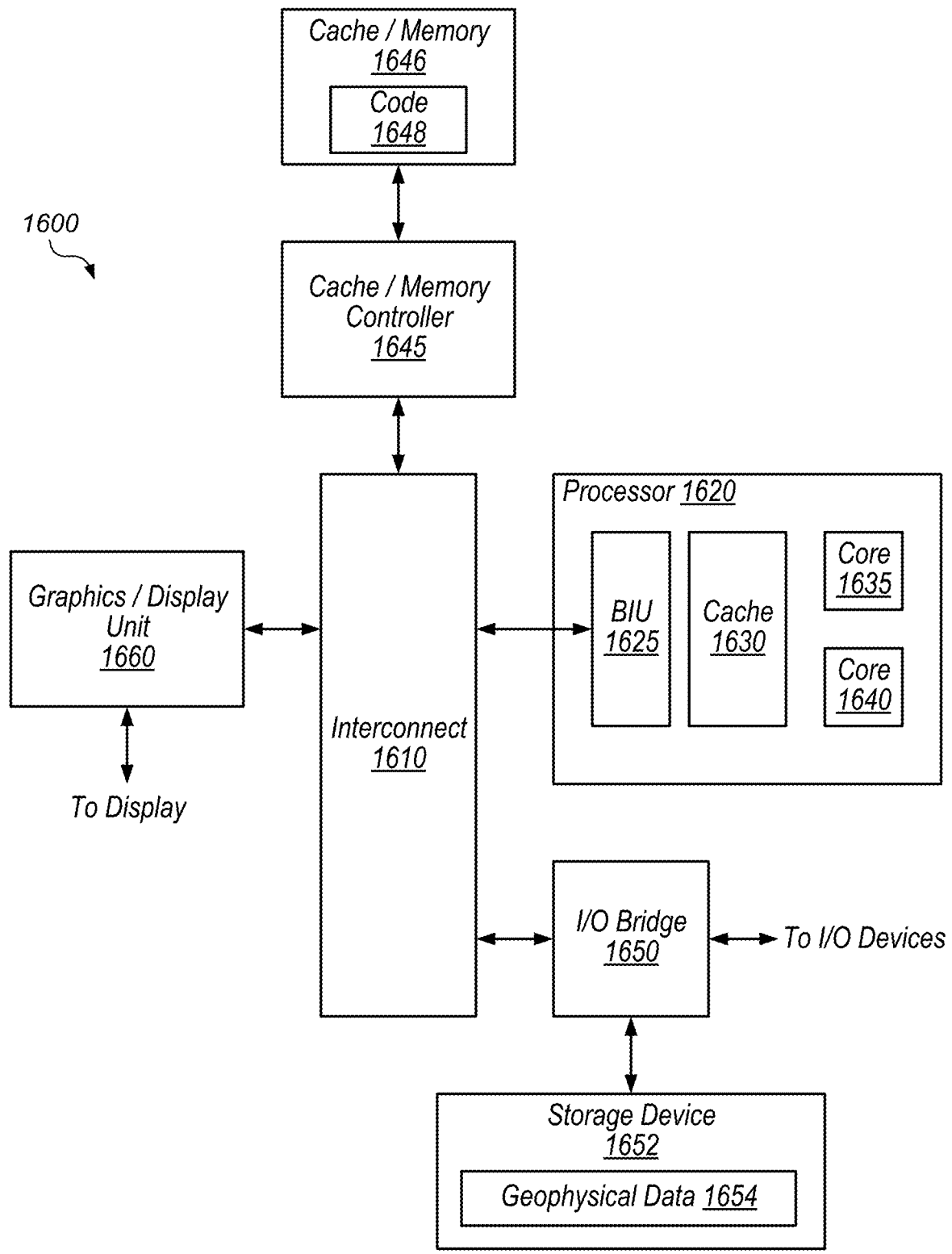
FIG. 16 is a block diagram illustrating a computing system, according to some embodiments.

Referring now to FIG. 16, a block diagram illustrating an embodiment of a computing system 1600 is shown. The illustrated processing elements may be used to implement all or a portion of a marine seismic survey system or a data recording system, in some embodiments. While FIG. 16 illustrates an example organization of a computing device, numerous variations are possible and contemplated, and the illustrated configuration is expressly intended to be non-limiting. In the illustrated embodiment, computing system 1600 includes interconnect 1610, processor 1620, input/output (I/O) bridge 1650, storage device 1652, geophysical data 1654, cache/memory controller 1645, cache/memory 1646, code 1648, and graphics/display unit 1660.

Interconnect 1610 may include various devices configured to facilitate communication between various elements of computing system 1600. In some embodiments, portions of interconnect 1610 may be configured to implement various different communication protocols. In other embodiments, interconnect 1610 may implement a single communication protocol and elements coupled to interconnect 1610 may convert from the single communication protocol to other communication protocols internally.

In the illustrated embodiment, processor 1620 includes bus interface unit (BIU) 1625, cache 1630, and cores 1635 and 1640, although numerous variations of the illustrated organization are possible. For example, other numbers of processor cores may be employed. BIU 1625 may be configured to manage communication between processor 1620 and other elements of computing system 1600. Processor cores such as cores 1635 and 1640 may be configured to execute instructions of a particular instruction set architecture (ISA) which may include operating system instructions and user application instructions.

Cache/memory controller 1645 may be configured to manage transfer of data between interconnect 1610 and one or more caches and/or memories, including cache/memory 1646. For example, cache/memory controller 1645 may be coupled to an L3 cache, which may in turn be coupled to a system memory. In other embodiments, cache/memory controller 1645 may be directly coupled to a memory.

In the illustrated embodiment, cache/memory 1646 stores code 1648. In some embodiments, code 1648 may be used to configure the computing system 1600. In other embodiments, code 1648 may include instructions for processor 1620 to execute, such as instructions relating to the control of any of the systems or devices discussed above, such as for the operation of survey equipment and/or collection of survey data. Code 1648 may include other information not described here, including but not limited to data, configurations for other components of computing system 1600, or instructions to be executed by computing system 1600.

Graphics/display unit 1660 may include one or more processors and/or one or more graphics processing units (GPU's). In contrast to processor 1620, graphics/display unit 1660 may be specifically configured to perform graphics-related processing operations in order to present information on a display. In some embodiments, unit 1660 may be omitted; its operations may instead be performed by or integrated within processor 1620.

I/O bridge 1650 may include various elements configured to implement: universal serial bus (USB) communications, security, audio, and/or low-power always-on functionality, for example. I/O bridge 1650 may also include interfaces such as pulse-width modulation (PWM), general-purpose input/output (GPIO), serial peripheral interface (SPI), and/or inter-integrated circuit (I2C), for example. Various types of peripherals and devices may be coupled to device 1600 via I/O bridge 1650. In the illustrated embodiment, I/O Bridge 1650 is coupled to storage device 1652.

In some embodiments, storage device 1652 may be a hard disk drive or solid state drive. Storage device 1652 may be a tape drive, magnetic drive, removable media drive, etc. in some embodiments. In the illustrated embodiment, storage device 1652 includes geophysical data 1654. In some embodiments, storage device 1652, with geophysical data 1654 stored thereon, corresponds to the geophysical data product discussed above.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
towing, from one or more vessels during a portion of a marine seismic survey performed by a survey system, a set of multiple seismic sources at respective source offsets from a plurality of seismic streamers;
wherein the set of multiple seismic sources includes towing a set of one or more near offset seismic sources that includes all sources in the survey system whose source offsets are less than a first threshold source offset during the portion of the marine seismic survey;
wherein the set of multiple seismic sources further includes a set of one or more far offset seismic sources that includes all sources in the survey system whose source offsets remain between the first threshold source offset and a second, greater threshold source offset during the portion of the marine seismic survey;
actuating the set of near offset seismic sources during the portion of the marine seismic survey according to a first shot point interval, wherein the first shot point interval is a near offset shot point interval measured in distance or time between actuations of any member of the set of near offset seismic sources;
actuating the set of far offset seismic sources during the portion of the marine seismic survey according to a second shot point interval, wherein the second shot point interval is a far offset shot point interval measured in distance or time between actuations of any member of the set of near offset seismic sources, wherein the second shot point interval is longer in distance or time than the first shot point interval; and
collecting, via the plurality of seismic streamers, seismic data responsive to actuation of the one or more near offset seismic sources and the one or more far offset seismic sources.

2. The method of claim 1, wherein:
actuating the set of near offset seismic sources comprises alternately actuating each of two near offset seismic sources;
actuating the set of far offset seismic sources comprises alternately actuating each of two far offset seismic sources; and
the second shot point interval is substantially three times the first shot point interval.

3. The method of claim 1, wherein determination of the first and second shot point intervals is based at least in part on wave frequencies of the far offset seismic sources.

4. The method of claim 1, wherein the set of far offset sources include sources which are configured to emit seismic energy, wherein a majority of seismic energy is emitted at a frequency below 25 Hz.

5. The method of claim 1, wherein the second shot point interval is an integer multiple of the first shot point interval, such that when the set of far offset seismic sources actuate, the set of far offset seismic sources actuate substantially simultaneously with the set of near offset seismic sources.

6. The method of claim 1, wherein:
the plurality of seismic streamers includes at least two arrays that are respectively coupled to at least two seismic streamer vessels.

7. The method of claim 1:
wherein the set of multiple seismic sources includes a set of one or more mid offset seismic sources that includes all sources in the survey system whose source offsets are greater than the offset of any sources in the set of one or more near offset seismic sources and less than the offset of any sources in the set of one or more far offset sources during the portion of the marine seismic survey;
the method further comprising actuating the set of mid offset seismic sources according to a third shot point interval.

8. The method of claim 7, wherein the set of mid offset seismic sources and the set of far offset seismic sources are located on a same side of the seismic streamers in a crossline direction.

9. The method of claim 1, wherein at least one of the one or more near offset seismic sources or at least one of the one or more far offset seismic sources includes an air gun.

10. The method of claim 1, wherein at least one of the set of near offset seismic sources or at least one of the set of far offset seismic sources includes a marine vibrator.

11. The method of claim 1, wherein there are fewer far offset seismic sources than near offset seismic sources.

12. The method of claim 1, further comprising selecting the first and second shot point intervals dependent upon one or more performance requirements of a full wave inversion process.

13. A survey system, comprising:
a plurality of seismic streamers;
a set of multiple seismic sources that includes:
a set of one or more near offset seismic sources;
a set of one or more far offset seismic sources; and
survey equipment configured to:
tow, from one or more vessels during a portion of a marine seismic survey performed by the survey system, the set of multiple seismic sources at respective source offsets from the plurality of seismic streamers;
wherein the set of one or more near offset seismic sources includes all sources in the survey system whose source offsets are less than a first threshold source offset during the portion of the marine seismic survey;
wherein the set of one or more far offset seismic sources includes all sources in the survey system whose source offsets remain between the first threshold source offset and a second, greater threshold source offset during the portion of the marine seismic survey;
actuate at least one of the set of one or more near offset seismic sources according to a first shot point interval, wherein the first shot point interval is a near offset shot point interval measured in distance or time between actuations of any source in the set of one or more near offset seismic sources;
actuate at least one of the set of one or more far offset seismic sources according to a second shot point interval, wherein the second shot point interval is a far offset shot point interval measured in distance or time between actuations of any source in the set of one or more far offset seismic sources, wherein the second shot point interval is greater in time or distance than the first shot point interval, wherein the second shot point interval is an integer multiple of the first shot point interval, and wherein actuation of at least one source in the set of one or more far offset seismic sources is configured to occur substantially simultaneously with at least source in the set of one near offset seismic sources;

wherein the plurality of seismic streamers is configured to receive seismic data responsive to actuation of the set of one or more far offset seismic sources and the set of one or more far offset seismic sources during the portion of the marine seismic survey; and a recording system configured to generate a stored record of the seismic data.

14. The system of claim 13, wherein determination of the first and second shot point intervals is based at least in part on wave frequencies of the set of one or more far offset seismic sources.

15. The system of claim 13, wherein the seismic streamers include two or more arrays that are respectively coupled to two or more vessels.

16. The system of claim 15, wherein the set of one or more near offset seismic sources includes two or more seismic sources respectively coupled to the two or more vessels, and wherein the set of one or more far offset seismic sources includes a source that is located substantially equally distant from the two or more vessels.

17. The system of claim 13, further comprising a set of one or more mid offset seismic sources, wherein the survey equipment is further configured to tow the set of one or more mid offset seismic sources during the portion of the marine seismic survey, wherein the set of mid offset seismic sources includes all sources in the survey system whose source offsets are greater than the offset of any sources in the set of one or more near offset seismic sources and less than the offset of any sources in the set of one or more far offset sources during the portion of the marine seismic survey, and wherein the set of one or more mid offset seismic sources are configured to actuate according to a third shot point interval.

18. The system of claim 13, wherein the set of one or more near offset seismic sources and at least one of the plurality of seismic streamers are coupled to a same vessel.

19. A method of manufacturing a geophysical data product, comprising:

towing, from one or more vessels during a portion of a marine seismic survey performed by a survey system, a set of multiple seismic sources at respective source offsets from a plurality of seismic streamers;

actuating one or more members of a set of near offset seismic sources in the marine seismic survey according to a first firing pattern during a portion of the marine seismic survey, wherein the set of near offset sources includes all sources in the survey system whose source offsets are less than a first threshold source offset during the portion of the marine seismic survey;

actuating one or more members of a set of far offset seismic sources according to a second firing pattern during the portion of a marine seismic survey, wherein the set of far offset sources includes all sources in the survey system whose source offsets remain between the first threshold source offset and a second, greater threshold source offset during the portion of the marine seismic survey, wherein under the second firing pattern, the set of far offset seismic sources fire less frequently than the set of near offset seismic sources;

collecting, via the plurality of seismic streamers, geophysical data responsive to actuation of the one or more members of the set of near offset seismic sources and the one or more members of the set of far offset seismic sources during the portion of the marine seismic survey; and storing the geophysical data on a tangible, computer-readable medium, thereby completing the manufacture of the geophysical data product.

20. The method of claim 19, wherein:

actuating the one or more members of the set of near offset seismic sources comprises alternately actuating each of two near offset seismic sources;

actuating the one or more members of the set of far offset seismic sources comprises alternately actuating each of two far offset seismic sources; and the first firing pattern fires substantially three times as often as the second firing pattern.

* * * * *

UNITED STATES PATENT AND TRADEMARK OFFICE
CERTIFICATE OF CORRECTION

PATENT NO. : 10,871,588 B2
APPLICATION NO. : 15/823221
DATED : December 22, 2020
INVENTOR(S) : Beitz et al.

Page 1 of 1

It is certified that error appears in the above-identified patent and that said Letters Patent is hereby corrected as shown below:

In the Claims

In Claim 1 at Line 40, replace "near" with --far--.

Signed and Sealed this
Eleventh Day of January, 2022

Drew Hirshfeld
*Performing the Functions and Duties of the
Under Secretary of Commerce for Intellectual Property and
Director of the United States Patent and Trademark Office*